United States Patent
Saradhi et al.

(10) Patent No.: US 11,726,955 B2
(45) Date of Patent: Aug. 15, 2023

(54) METHODS AND APPARATUS FOR EFFICIENT CONTAINER LOCATION DATABASE SNAPSHOT OPERATION

(71) Applicant: HEWLETT PACKARD ENTERPRISE DEVELOPMENT LP, Houston, TX (US)

(72) Inventors: Uppaluri Vijaya Saradhi, Hyderabad (IN); Chandra Guru Kiran Babu Sanapala, Hyderabad (IN); Prasad Boddupalli, Hyderabad (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/190,022

(22) Filed: Nov. 13, 2018

(65) Prior Publication Data
US 2019/0146947 A1 May 16, 2019

Related U.S. Application Data

(63) Continuation-in-part of application No. 16/116,796, filed on Aug. 29, 2018, now Pat. No. 11,100,055,
(Continued)

(51) Int. Cl.
*G06F 16/11* (2019.01)
*G06F 16/174* (2019.01)
(Continued)

(52) U.S. Cl.
CPC .......... *G06F 16/128* (2019.01); *G06F 16/134* (2019.01); *G06F 16/174* (2019.01); *G06F 16/1844* (2019.01)

(58) Field of Classification Search
CPC ........ G06F 16/23; G06F 16/27; G06F 16/128; G06F 16/134; G06F 16/174;
(Continued)

(56) References Cited

U.S. PATENT DOCUMENTS 6,167,490 A     12/2000  Levy et al.
6,341,341 B1 *   1/2002  Grummon ............. G06F 3/0617
                                                    711/162
(Continued)

FOREIGN PATENT DOCUMENTS

EP    1003103 A2    5/2000
EP    1875384 A2    1/2008
(Continued)

OTHER PUBLICATIONS

Anderson, T et al., "Serverless Network File Systems", ACM, Dec. 1995, pp. 1-21.
(Continued)

*Primary Examiner* — Augustine K. Obisesan
(74) *Attorney, Agent, or Firm* — Trop, Pruner & Hu, P.C.

(57) ABSTRACT

The efficiency of a container location database ("CLDB") that is used for retrieving location information of data containers stored on nodes in a cluster is improved by decreasing the number of key-value store transactions performed during snapshot creation and deletion, thereby decreasing both disk I/O and computing cycles. The CLDB is made more scalable by improving the deletion and creation time of snapshots, allowing one to create and delete more snapshots during a given interval of time. CLDB resilience is improved by decreasing the time required to resync a CLDB node. CLDB data is reduced to decrease IO operations, improve resync times, and to cache most of the data in memory.

20 Claims, 8 Drawing Sheets

Related U.S. Application Data which is a continuation of application No. 15/668,666, filed on Aug. 3, 2017, now Pat. No. 10,146,793, which is a continuation of application No. 15/381,733, filed on Dec. 16, 2016, now Pat. No. 9,798,735, which is a continuation of application No. 14/951,437, filed on Nov. 24, 2015, now Pat. No. 9,773,016, which is a continuation of application No. 13/340,532, filed on Dec. 29, 2011, now Pat. No. 9,207,930, which is a continuation-in-part of application No. 13/162,439, filed on Jun. 16, 2011, now Pat. No. 9,323,775.

(60) Provisional application No. 61/356,582, filed on Jun. 19, 2010, provisional application No. 62/586,457, filed on Nov. 15, 2017.

(51) Int. Cl.
*G06F 16/13* (2019.01)
*G06F 16/182* (2019.01)

(58) Field of Classification Search
CPC .. G06F 16/178; G06F 16/1844; G06F 16/182; G06F 2201/84; G06F 16/1873; G06F 3/065; G06F 3/0626; G06F 11/1435; G06F 16/119; G06F 11/203; Y10S 707/99953; Y10S 707/99956
See application file for complete search history.

(56) References Cited

U.S. PATENT DOCUMENTS

| | | | |
|---|---|---|---|
| 7,409,497 B1 | 8/2008 | Kazar et al. | |
| 7,478,263 B1 | 1/2009 | Kownacki et al. | |
| 7,523,110 B2 | 4/2009 | Holenstein et al. | |
| 7,523,123 B2 | 4/2009 | Yang et al. | |
| 7,613,740 B2 | 11/2009 | Holenstein et al. | |
| 7,650,331 B1 | 1/2010 | Dean et al. | |
| 7,653,668 B1 | 1/2010 | Shelat et al. | |
| 7,707,165 B1 | 4/2010 | Jiang et al. | |
| 7,774,469 B2 | 8/2010 | Massa et al. | |
| 7,849,057 B1 * | 12/2010 | Kazar | G06F 16/128 707/639 |
| 7,987,167 B1 | 7/2011 | Kazar et al. | |
| 8,078,816 B1 | 12/2011 | Thoppai et al. | |
| 8,117,156 B2 | 2/2012 | Krishnaprasad et al. | |
| 8,234,372 B2 | 7/2012 | Knapp et al. | |
| 8,312,046 B1 | 11/2012 | Eisler et al. | |
| 8,312,237 B2 | 11/2012 | Koziy et al. | |
| 8,359,495 B2 | 1/2013 | Candea et al. | |
| 8,417,681 B1 | 4/2013 | Miloushev et al. | |
| 8,498,967 B1 | 7/2013 | Chatterjee et al. | |
| 8,572,031 B2 | 10/2013 | Merriman et al. | |
| 8,621,270 B2 | 12/2013 | Isherwood et al. | |
| 8,706,833 B1 | 4/2014 | Bergant et al. | |
| 8,719,223 B2 | 5/2014 | Knapp et al. | |
| 8,762,493 B1 | 6/2014 | Kirmse et al. | |
| 8,825,602 B1 | 9/2014 | Desai et al. | |
| 8,850,018 B2 | 9/2014 | Massa et al. | |
| 8,898,410 B1 | 11/2014 | Ehrenberg | |
| 8,930,312 B1 | 1/2015 | Rath et al. | |
| 8,972,345 B1 | 3/2015 | Aguilera | |
| 9,021,229 B2 | 4/2015 | Ananthanarayanan et al. | |
| 9,026,559 B2 | 5/2015 | Bernbo et al. | |
| 9,207,930 B2 | 12/2015 | Srivas et al. | |
| 9,684,453 B2 | 6/2017 | Holt et al. | |
| 10,102,029 B2 | 10/2018 | Gupta et al. | |
| 2002/0161889 A1 | 10/2002 | Gamache et al. | |
| 2004/0193622 A1 | 9/2004 | Peleg et al. | |
| 2004/0267829 A1 | 12/2004 | Hirakawa et al. | |
| 2005/0246393 A1 | 11/2005 | Coates et al. | |
| 2006/0184731 A1 | 8/2006 | Corbett et al. | |
| 2006/0200501 A1 | 9/2006 | Holenstein et al. | |
| 2006/0248088 A1 | 11/2006 | Kazar et al. | |
| 2006/0248273 A1 | 11/2006 | Jernigan et al. | |
| 2006/0248294 A1 | 11/2006 | Nedved et al. | |
| 2007/0101069 A1 | 5/2007 | Corbett et al. | |
| 2007/0189153 A1 | 8/2007 | Mason | |
| 2007/0288526 A1 | 12/2007 | Mankad et al. | |
| 2008/0127146 A1 | 5/2008 | Liao et al. | |
| 2008/0270461 A1 | 10/2008 | Gordon et al. | |
| 2009/0019098 A1 | 1/2009 | Gunda et al. | |
| 2009/0055370 A1 | 2/2009 | Dagum et al. | |
| 2009/0271412 A1 | 10/2009 | Lacapra et al. | |
| 2010/0005080 A1 | 1/2010 | Pike et al. | |
| 2010/0106934 A1 | 4/2010 | Calder et al. | |
| 2010/0114889 A1 | 5/2010 | Rabii et al. | |
| 2010/0241828 A1 | 9/2010 | Yu et al. | |
| 2011/0082836 A1 | 4/2011 | Wang et al. | |
| 2011/0099351 A1 | 4/2011 | Condict | |
| 2011/0145497 A1 | 6/2011 | Bish et al. | |
| 2011/0213994 A1 | 9/2011 | Thereska et al. | |
| 2011/0295968 A1 | 12/2011 | Takaoka et al. | |
| 2011/0313973 A1 * | 12/2011 | Srivas | G06F 16/235 707/634 |
| 2012/0023209 A1 | 1/2012 | Fletcher et al. | |
| 2012/0101991 A1 * | 4/2012 | Srivas | G06F 16/1865 707/623 |
| 2014/0081918 A1 | 3/2014 | Srivas et al. | |
| 2014/0172898 A1 * | 6/2014 | Aguilera | G06F 16/2452 707/759 |
| 2014/0279909 A1 * | 9/2014 | Sudarsanam | G06F 16/128 707/639 |
| 2015/0154243 A1 | 6/2015 | Danaher | |
| 2017/0277469 A1 * | 9/2017 | Cohen | G06F 3/0631 |
| 2017/0316028 A1 * | 11/2017 | Kanteti | G06F 16/1724 |
| 2018/0121453 A1 * | 5/2018 | Jain | G06F 11/1448 |
| 2019/0004704 A1 * | 1/2019 | Rathi | G06F 3/0664 |
| 2019/0155937 A1 | 5/2019 | Barve et al. | |

FOREIGN PATENT DOCUMENTS

| | | |
|---|---|---|
| JP | 2010-092222 A | 4/2010 |
| WO | 94/29807 A1 | 12/1994 |
| WO | 2006/015097 A2 | 2/2006 |
| WO | 2006/118593 A2 | 11/2006 |
| WO | 2008/058230 A2 | 5/2008 |
| WO | 2010/033150 A1 | 3/2010 |

OTHER PUBLICATIONS

Cabrera, L. et al., "Swift: Using Distributed Disk Striping to Provide High I/O Data Rates", vol. 4, No. 4, Nov. 1991, pp. 405-436.

European Search Report received for EP Patent Application No. 11796537.6, dated May 9, 2017, 24 pages.

Ghemawat, S et al., "The Google File System", SOSP'03, Oct. 19-22, 2003, 15 pages.

Gibson et al., "A Cost-Effective, High-Bandwidth Storage Architecture", Proceedings of the 8th Conference on Architectural Support for Programming Languages and Operating Systems, 1998, pp. 1-12.

Gillick, et al., "MapReduce: Distributed computing for Machine Learning", Dec. 18, 2006, 12 pages.

Schmuck, F. et al., "GPFS: A Shared-Disk File System for Large Computing Clusters", Proc. of the Conference on File and Storage Technologies (FAST '02); California, USA, Jan. 28-30, 2002, 15 pages.

International Search Report and Written Opinion received for PCT Application No. PCT/US2011/040936, dated Oct. 10, 2011, 8 pages.

Tom White, "Hadoop: The Definitive Guide" O'Reilly Japan, Inc., Jun. 2009, 1st Edition, 27 pages.

Wikipedia, "Unix File System", available online at <https://en.wikipedia.org/w/index.php?title=Unix_File_System&oldid=367930778>, Jun. 14, 2010, pp. 1-5.

Wu et al., "Managing storage space in a flash and disk hybrid storage system", 2009 IEEE International Symposium on Modeling, Analysis & Simulation of Computer and Telecommunication Systems, Sep. 21-23, 2009, pp. 1-9.

(56) References Cited

OTHER PUBLICATIONS

Amir Friedman, "Disk Emulation Using Flash Memory," 1993 Proceedings Fifth Biennial Nonvolatile Memory Technology Review, Jun. 22-24, 1993, pp. 61-65.

Carnegie Melon University, "What is Andrew?", available online at <https://web.archive.org/web/20081220010320/http://www.cmu.edu/corporate/news/2007/features/andrew/what_is_andrew.shtml>, Dec. 20, 2008, 3 pages.

Dean et al., "MapReduce: Simplified Data Processing on Large Clusters", OSDI'04: In Proceedings of OSDI '04: 6th Symposium on Operating Systems Design and Implementation, USENIX Association, Dec. 2004, pp. 137-149.

Dhruba Borthakur, "HDFS Architecture Guide", 2008, 14 pages.

Hadoop Wiki, "Introduction", Project Description, available online at <https://web.archive.org/web/20100526102050/http://wiki.apache.org/hadoop/ProjectDescription>, May 26, 2010, 2 pages.

Hunt et al., "ZooKeeper: Wait-free coordination for Internet-scale systems", In USENIX annual technical conference, Jun. 2010, 14 pages.

IBM, "General Parallel File System Version 3 Release 5.0.11; Advanced Administration Guide", 2013, 288 pages.

Jason Barkes et al., "GPFS: A Parallel File System", Apr. 1998, 256 pages.

Martin Streicher, "Scale your file system with Parallel NFS", available online at <https://web.archive.org/web/20090228174924/http://www.ibm.com/developerworks/linux/library/l-pnfs/>, Nov. 26, 2008, 6 pages.

pnfs.com Authors, "pnfs.com", available onnline at <https://web.archive.org/web/20100210000521/http://www.pnrs.com/>, Feb. 10, 2010, 2 pages.

Uresh Vahalia, "UNIX Internals: The New Frontiers", UNIX Internals: The New Frontiers, Pearson Education Ltd., May 15, 2000, 1st Ed., 40 pages.

Weil et al, "Ceph: A Scalable, High-Performance Distributed File System", Proceedings of the 7th Conference on Operating Systems Design and Implementation, OSDI '06, Nov. 2006, 14 pages.

\* cited by examiner

Snapshot:container ID   Run length
                 1001   1002

METHODS AND APPARATUS FOR EFFICIENT CONTAINER LOCATION DATABASE SNAPSHOT OPERATION

CROSS REFERENCE TO RELATED APPLICATIONS

This application claims priority to U.S. provisional patent application Ser. No. 62/586,457, filed Nov. 15, 2017, and in a continuation-in-part of U.S. patent application Ser. No. 16/116,796, filed Aug. 29, 2018, each of which application is incorporated herein in its entirety by this reference thereto.

FIELD

The invention relates to a map-reduce file system. More particularly, the invention relates to method and apparatus for efficient container location database snapshot operation.

BACKGROUND

U.S. Pat. No. 9,323,775 (which is incorporated herein in its entirety by this reference thereto) discloses a distributed file system that provides transactional read-write-update semantics with file chunk replication and huge file-create rates. Such file system offers major technical advantages for map-reduce computing clusters. Such file system has a number of technical innovations that make this possible for the first time and thus provides an example of how a map-reduce compatible distributed file system can be built. Such file system consists of successive component layers that each provide the basis on which the next layer is built. These include:

A primitive storage layer referred to as storage pools. Storage pools knit together raw block stores and provide a storage mechanism for containers and transaction logs. Storage pools are manipulated by individual file servers.

Containers which provide the fundamental basis for data replication, relocation and transactional updates.

A container location database (CLDB) which allows containers to be found among all file servers, as well as defining precedence among replicas of containers for the purposes of organizing transactional updates of container contents.

Volumes which facilitate the control of the placement of data, creation of snapshots and mirrors, and the retention of a variety of control and policy information.

Key-value stores which allow keys to be related to data for many purposes such as directories, container location maps, and offset maps in compressed files.

Key-value store operations during snapshot creation and deletion transactions are performed to record and delete information about snapshots and snapshot containers. This includes information such as the list of snapcids associated with a snapshot, size of snapcids, etc.

Some of the information is recorded only once, such as the list of snapcids, while other information, such as the size of snapcids, is updated more than once. Transactions are also performed to service requests, such as container locations. The resulting large number of transactions result in significant disk activity.

Snapshot information tables are large. Hence, they result in contention among transactions. For example, certain transactions need an exclusive lock. Thus, these tables have the effect on such transaction of slowing them down. Large tables also result in large scan times during resync. Hence, resync of a CLDB volume increases in proportion to the state maintained by the CLDB. The large number of data accesses by the CLDB causes significant churn of local file server caches, thus slowing access to other critical data.

SUMMARY

Methods and apparatus for improving the efficiency of a container location database ("CLDB") that is used for retrieving location information of data containers stored on nodes in a cluster are described.

Embodiments of the invention improve performance by decreasing the number of key-value store transactions performed during snapshot creation and deletion, thereby decreasing both disk I/O and computing cycles.

Embodiments of the invention make the CLDB more scalable by improving the deletion and creation time of snapshots, allowing one to create and delete more snapshots during a given interval of time.

Embodiments of the invention improve CLDB resilience by decreasing the time required to resync a CLDB node. This is accomplished by decreasing resync time of the special container number 1, which is where the CLDB maintains the root information for the entire cluster. The idea is that decreasing the amount of data in container 1 and decreasing the amount of updates to that container makes it easier to replicate container 1 and thus makes it easier for the system to recover normal operations by reference to secondary replicas of container 1.

Embodiments of the invention reduce CLDB data, to decrease IO operations, improve resync times, and to cache most of the data in memory.

Embodiments of the invention reduce information recorded at the CLDB for each snapshot. Some of the snapshot information can be derived from other sources, e.g. snapcid information can be derived from the corresponding RW cid. Some of the information can be stored in aggregate form, e.g. store a block of snapcids, rather than each snapcid in the key-value store. Embodiments of the invention also avoid recording information that is only temporary in nature, such as the size of each snapcid. Embodiments of the invention also leverage data available from file servers, such as the RW cid corresponding to a snapcid.

DESCRIPTION

Methods and apparatus for improving the efficiency of a container location database (CLDB) that is used for retrieving location information of data containers stored on nodes in a cluster are described.

Figure 1:
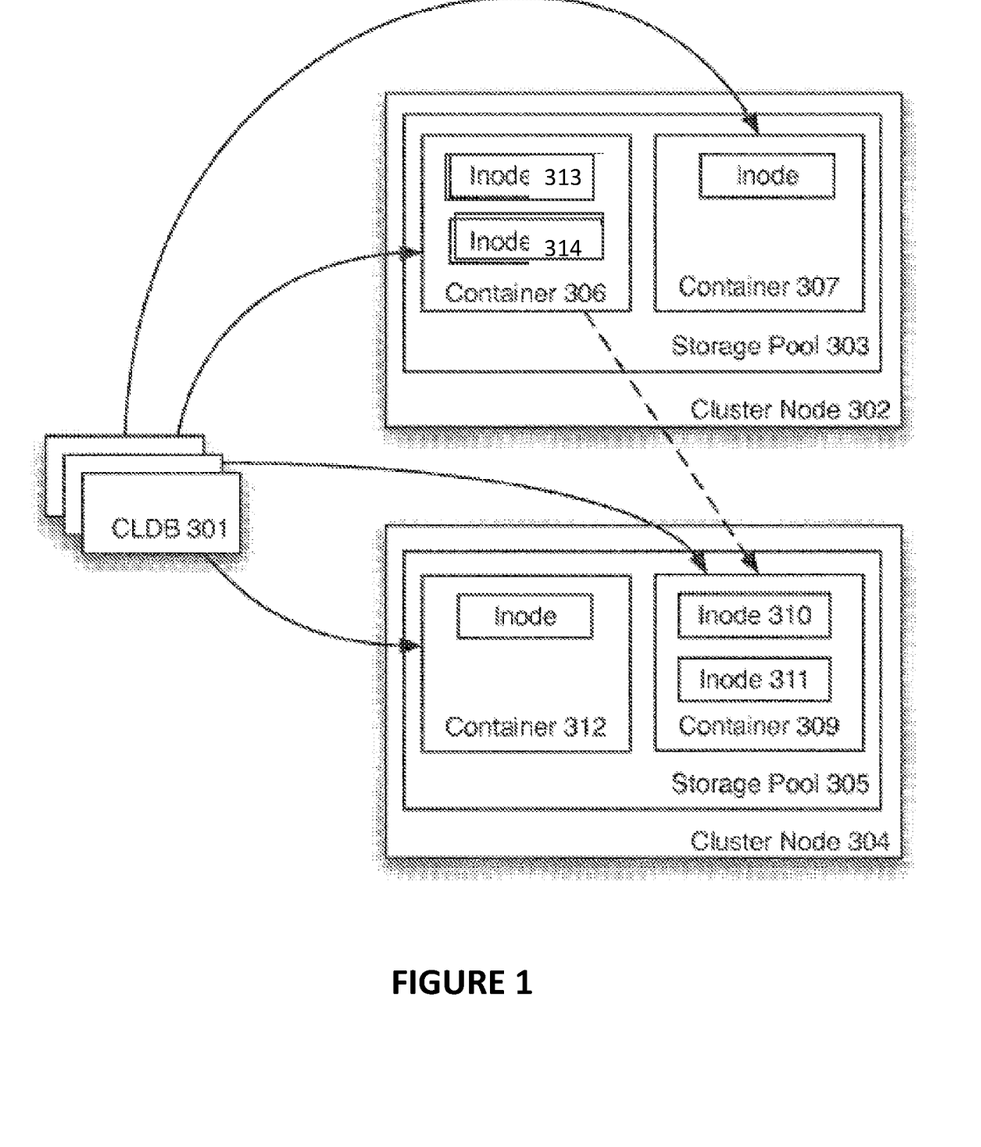
FIG. 1 is a block schematic diagram showing the structure of a distributed file system.

U.S. Pat. No. 9,323,775 (which is incorporated herein in its entirety by this reference thereto) discloses a distributed file system that provides transactional read-write-update semantics with file chunk replication and huge file-create rates. FIG. 1 is a block schematic diagram showing the structure of a distributed file system having a CLDB 301 and cluster nodes 302, 304. Each cluster node contains one or more storage pools 303, 305. Each storage pool can contain zero or more containers 306, 307, 309, 312. Data is structured within containers using inodes, e.g. 310, 311, 313, 314. Containers are replicated to other cluster nodes with one container designated as master, e.g. container 306 for each replica chain. The CLDB maintains information about where each container is located. The CLDB is maintained by several redundant servers and the data in the CLDB is itself stored as inodes in well-known containers.

Containers in a distributed file system are the unit of replication. The CLDB assigns as many nodes as are necessary to meet policy constraints to act as replicas of the data in a container. Replication must, however, survive as many combinations of node failures as possible. One strategy used for this is to have the CLDB assign each container to a master node that controls all transactions for that container. In addition, the CLDB designates a chain of nodes to hold replicas. If one of the replicas goes down or is separated from the master CLDB node, it is removed from the replication chain. If the master goes down or is separated, a new master is designated. Any node that comes back after having been removed from the replication chain is reinserted at the end of the replication chain if the chain still needs another replica when the node returns. If the node returns quickly, it is likely that no new node to replicate the container in question has been designated and the chain still needs a replica. If the node has been gone for a long time, the CLDB may have designated some other node to take a place in the chain in the meantime.

Snapshots

All inode data structures and indirect data b-trees have version numbers to facilitate updating container replicas that have missed transactions. To bring a replication chain up to date, a snapshot of the container inode on the replication master is created to freeze any further changes during the update process. The last version of the snapshot is compared to the last version of the replication chain to be updated. If the versions are equal, no updates are needed. If an update is needed, each child of the snapshot inode is examined recursively in the same fashion to find inodes or blocks in the replication chain that are behind the snapshot. Once the replication chain is up to date with the master snapshot, the entire process of snapshot replication can be repeated or transactions from the master replicas write-ahead log can be replayed to bring the replication chain fully up to date. Transactional snapshots based replication allow operations to continue normally under almost all plausible failure scenarios and, in a degraded fashion, even under extreme failure scenarios.

The relevant data set in embodiments of the invention is referred to as a container, which is essentially a small bag of storage. The volume of data in a container can vary, but a typical size may be 32 GB. The data in a container can be characterized as original or production data and is updated or accessed in real time as needed. It contains data used by applications and users making queries that require current, up-to-date data. A container is stored in a storage pool on a node and a node is one of many in a cluster. A storage pool is typically a set of disks or solid state storage devices (SSD), etc. on a node, each of which is referred to herein as a disk even though the storage itself may actually be an SSD.

The other data set that is relevant to the invention is referred to as a snapshot container. A snapshot is essentially a photocopy or a picture of a container at a specific time created by making copies of the root of the tree that ultimately references blocks of disk data. The snapshot is stored on the same node as the original container of which it is a copy. However, data in a snapshot does not mutate; it cannot change, whereas data in the container, as noted, can and does change. This is implemented by marking blocks in the original as having a snapshot reference. If new data is written to any of these blocks, it is written to new blocks on disk. The path in the tree of references in the original container leading to the blocks that are being overwritten is copied to the snapshot container and a reference to the original data blocks is retained in the snapshot. Thus, a snapshot shows what the container looked like at a particular time. Snapshots are useful for creating backups of data, restoring data if corruption is detected, accessing previous versions of data when applications fail, and other uses. In addition, if an application needs to freeze data at a particular moment to maintain the consistency of on-disk data structures as they are analyzed, snapshots of the container can be used. Snapshots of individual containers can be combined to provide snapshots of larger structures such as volumes.

Containers and snapshot containers are stored across nodes. A node has processing power, memory, and access to storage, for example it may have 16 CPUs and disk drive or solid state drive, wherein a group of nodes, e.g. 100 nodes, form a cluster. Containers can be arranged into a data structure referred to as a volume that provides the functions of directories and data objects such as files, tables, and message streams.

It is necessary at times to access a snapshot of a container. In some environments or scenarios, snapshot activity, that is, locating and accessing container snapshots by an application or a user, can be quite high. In these cases, snapshots have to be located so that the data that they reference can be read. Accordingly, the system or platform must know which node stores the snapshot and the data to which the snapshot container refers. In the described embodiment, snapshot containers are collocated with the original containers that they replicate and are even collocated in the same storage pool.

A cluster of nodes has one or more special location nodes, referred to as container location database nodes or CLDB nodes. The CLDB may be described as the heart of the cluster or the governing body and provides data abstraction. In one embodiment, the CLDB is comprised of more than one node that make use a well-known container that is used to store internal data specific to the function of the CLDB. This internal data can contain, among other things, information about which snapshots exist, the containers used in the snapshots, and the mapping from snapshot containers back to read-write containers.

If an application needs to access data in a container, it goes to the CLDB first to find which nodes contain replicas of the container. The application asks the CLDB for information about a specific container and the CLDB responds to the application with information about the container, as well as information about the which nodes contain copies of the container. The container's association with a node is maintained by the CLDB. For example, in one embodiment, it contains a table that shows a mapping between container C and node N (see FIG. 1).

The CLDB also contains information about all of the snapshots of a container C. This information includes the snapshot identifiers (snapID's) for these snapshots, lists of the snapshot containers used in the snapshot, and an association between each snapshot container and the corresponding read-write container (snapcid). In embodiments, the location of each snapshot container is not necessarily stored because it can be found by determining the container ID of the corresponding read-write container and getting the location of that read-write container.

By design, read-write containers and all of the snapshot containers for that read-write container are collocated in the same storage pool, as was mentioned previously. For example, a snapshot of container 99 is made, in one embodiment, by the node storing container 99. These snapshots of a container are labelled with their own container numbers. A snapshot S1 of container 99 may be assigned a label or container number, for example, 1001. The next snapshot S2 of container 99 may be assigned container number 1002, and so on. Every time a snapshot of container 99 is taken it is assigned a number or label. In practice, snapshots of many containers are made to create a snapshot of a volume. The identifiers of these snapshots can be allocated sequentially in blocks. The CLDB is responsible for not only providing location mapping data for the containers but also for providing location data for every single snapshot taken by all nodes in the cluster.

As noted, this snapshot activity in the CLDB can significantly decrease the efficiency of the CLDB because extensive information must be kept about snapshots, about the potentially many snapshots containers that make up a single snapshot, and about snapshot containers and their relationship with read-write containers. The maintenance and querying of this information can be computationally expensive and, because the CLDB is involved in many critical operations for the entire cluster, this can compromise overall operations. It would be preferable for the CLDB not to have to handle as much information and to return information to applications that would imply some of this information rather than storing it explicitly.

When a snapshot of a volume is created and given a snapshot identifier, the list of all snapshot containers contained in the snapshot must be maintained together with mapping back to the list of read-write containers that correspond to the snapshot containers.
SnapId:SnapCid->*

Figure 2:
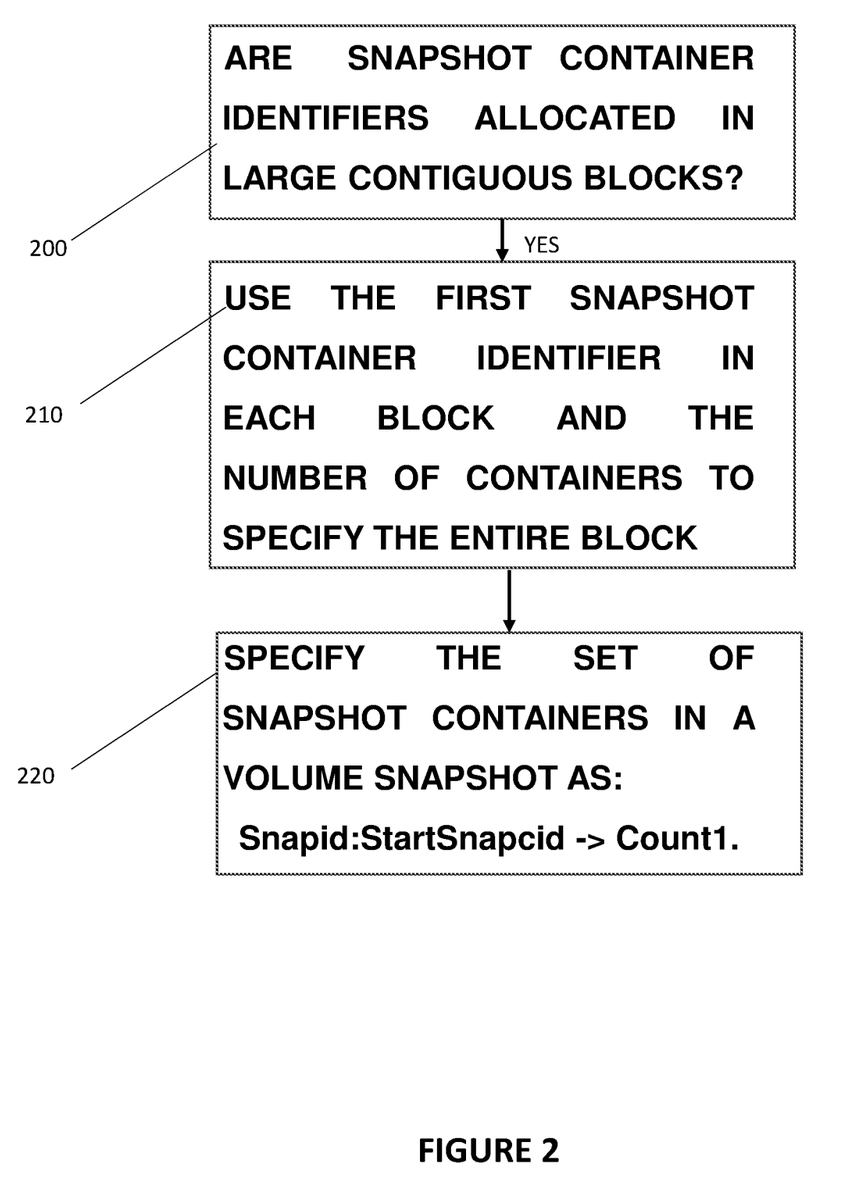
FIG. 2 is a flow diagram showing the use of a first snapshot container in a contiguous sequence of snapshot containers to specify a set of snapshot containers.

FIG. 2 is a flow diagram showing the use of a first snapshot container in a contiguous sequence of snapshot containers to specify a set of snapshot containers. The following algorithm converts a list of starting identifiers and run lengths into a list of identifiers:

```
# take a list of starting containers and run lengths
# return a possibly much longer list of containers
def expand(starts, lengths):
```

-continued

```
    r = [ ]
    # for each run
    for s,l in zip(starts, lengths):
        # expand and append to result
        for i in range(0,l):
            r.append(s+i)
    return(r)
```

In an embodiment of the invention, it is not necessary to store the list of all of the snapshot containers in a volume snapshot explicitly. Instead, snapshot container identifiers are allocated in large contiguous blocks (200) so that the first snapshot container identifier in each block and the number of containers suffices to specify the entire block (210). This allows the set of snapshot containers in a volume snapshot to be specified very compactly, in many cases as a single element even if thousands of snapshot containers are referenced.

Figure 3:
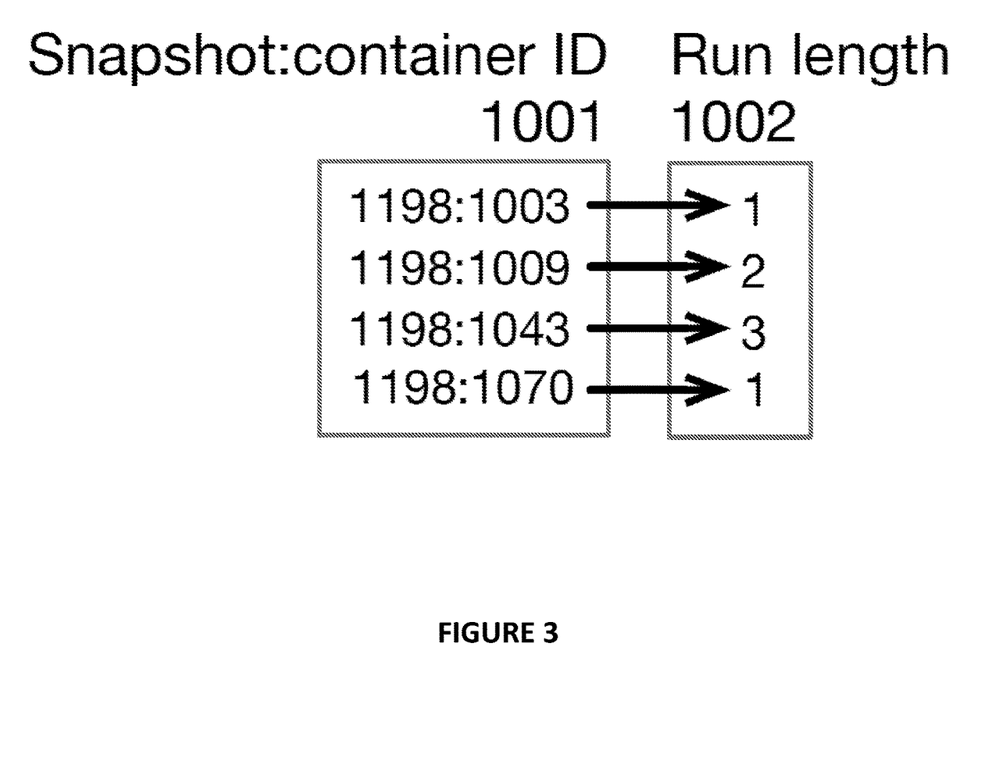
FIG. 3 shows a table in which the keys contain the snapshot identifier and the snapshot container identifier of the beginning of a block of consecutively numbered snapshot containers.
Figure 4:
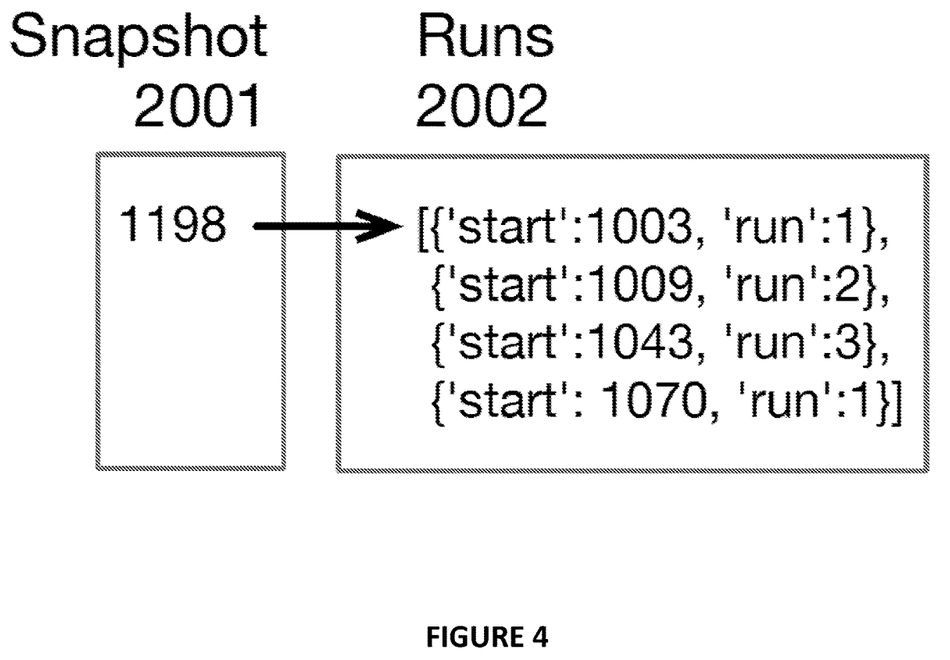
FIG. 4 illustrates alternative way of storing the information shown in FIG. 3.

FIG. 3 shows a table in which the keys 1001 contain the snapshot identifier and the snapshot container identifier of the beginning of a block of consecutively numbered snapshot containers. The value 1002 for each key consists simply of the number of snapshot container identifiers in the block of consecutive identifiers. An alternative way of storing this information is shown in FIG. 4 where the key 2001 is just the snapshot identifier and the value 2002 is a data structure, shown here in a JSON-like format for clarity, that contains the a sequence of data structures that each contain a snapshot container identifier and the number of snapshot container identifiers in the associated block of consecutive identifiers.

Thus, it is possible to capture the list of all snapcids corresponding to a snapshot very compactly. As noted, without this encoding, the table is large, resulting in the issues described above, e.g. contention, large number of transactions, and large resync time. In an embodiment, the table is now represented in a compact form by having each entry capture a block of snapcids. Each entry in this table is now as follows (220):

SnapId:StartSnapcid->Count1.

The new format results in far fewer transactions. Snapcids, when requested to be allocated, are allocated in blocks. Hence, the table can capture all snapcids of a snapshot in the new compact format.

Figure 5:
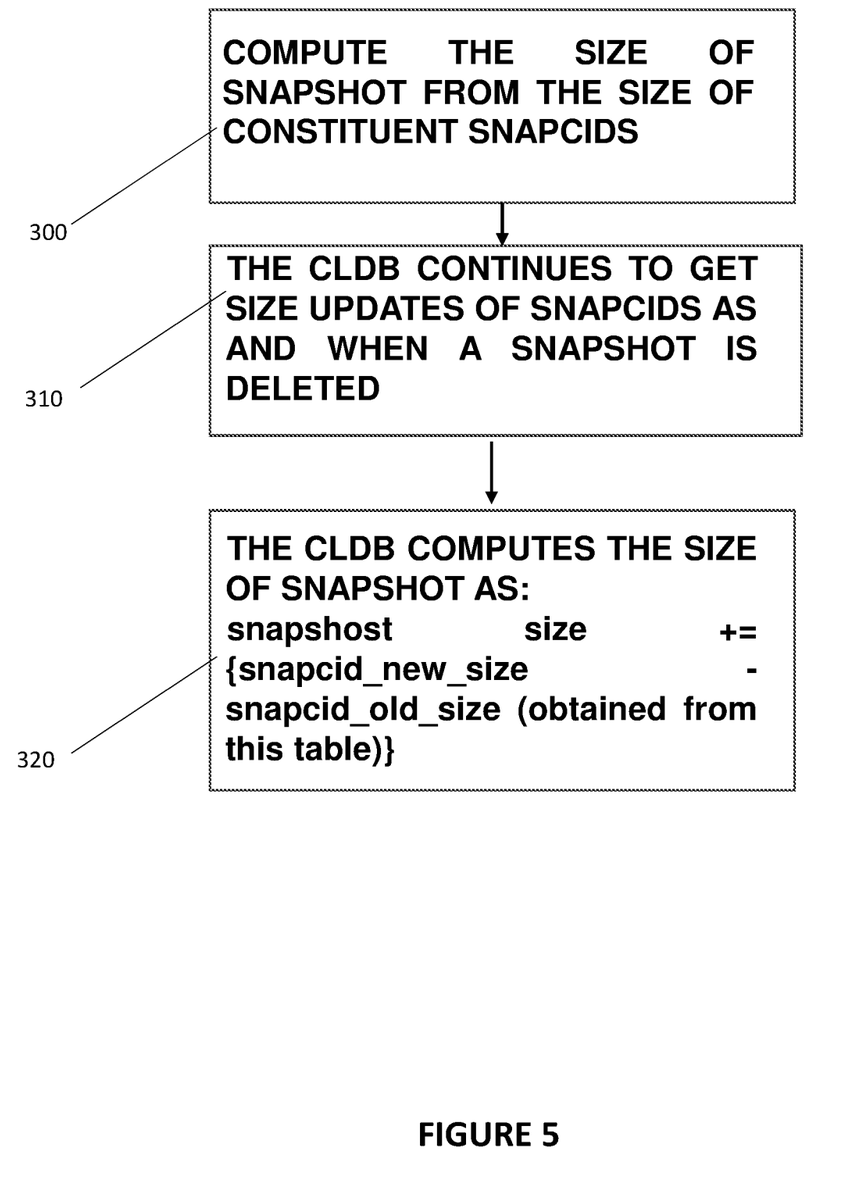
FIG. 5 is a flow diagram showing computing the size of a snapshot container from the size of constituent snapcids containers to compute the size of a snapshot.

FIG. 5 is a flow diagram showing computing the size of a snapshot container from the size of constituent snapcids containers to compute the size of a snapshot. Embodiments compute the size of snapshot from the size of constituent snapcids (300). The CLDB continues to get size updates of snapcids as and when a snapshot is deleted (310). Hence this table allows the CLDB to compute the size of snapshot as (320):

snapshost size+={snapcid_new_size-snapcid_old_size(obtained from this table)}

Figure 6:
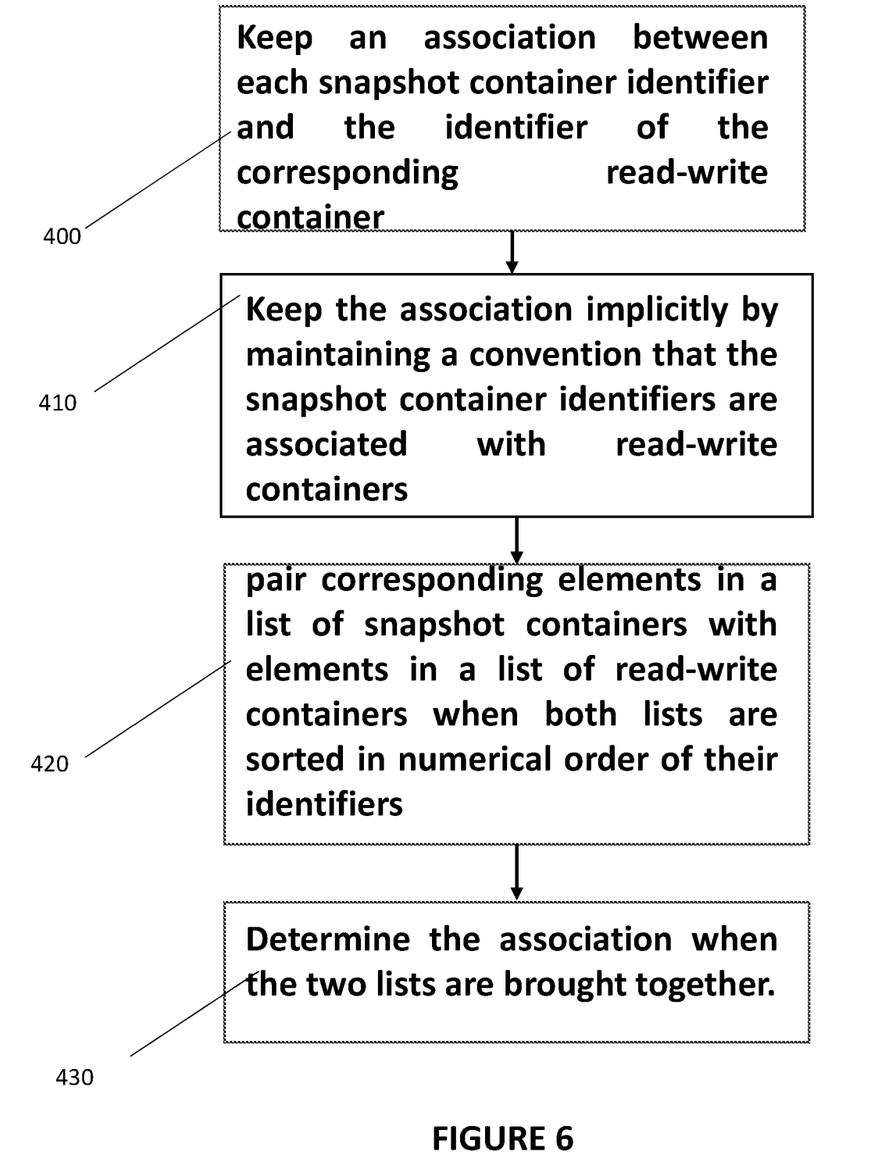
FIG. 6 is a flow diagram showing determination of snapcid location.

FIG. 6 is a flow diagram showing determination of snapcid location. The problem here is that we have a snapCid and we need to find the location of the snapshot container. Presently, an association is kept between each snapshot container identifier and the identifier of the corresponding read-write container (400). Because snapshot containers are always kept co-resident with their corresponding read-write containers, finding the identifier of the read-write container and then finding the location of that container suffices to give the location of the snapshot container. Embodiments of the invention eliminate the need for a table to convert from snapshot container identifier (snapCid) to read-write container identifier (rwCid)

In one embodiment of the invention, this association is kept implicitly by maintaining a convention that the snapshot container identifiers are associated with read-write containers (410) pairing corresponding elements in the list of snapshot containers with elements in the list of read-write containers when both are sorted in numerical order of their identifiers (420), which are integers in any case. This convention means that the association need not be stored explicitly, but instead is implicit in the list of read-write containers and snapshot containers. This implicit association is immutable and thus can be determined anywhere the two lists are brought together (430). This includes in some embodiments in applications themselves, but, importantly, need not be done in the CLDB itself. Even if done on the CLDB, the tables normally required can be eliminated because the association can be computed on the fly in a shorter time than would be required to look up each of the associations in a disk-resident file. This speedup is due partially to the compression effect of the encoding used to store the list of containers and partially due to the outright elimination of a lookup for each container.

Figure 7:
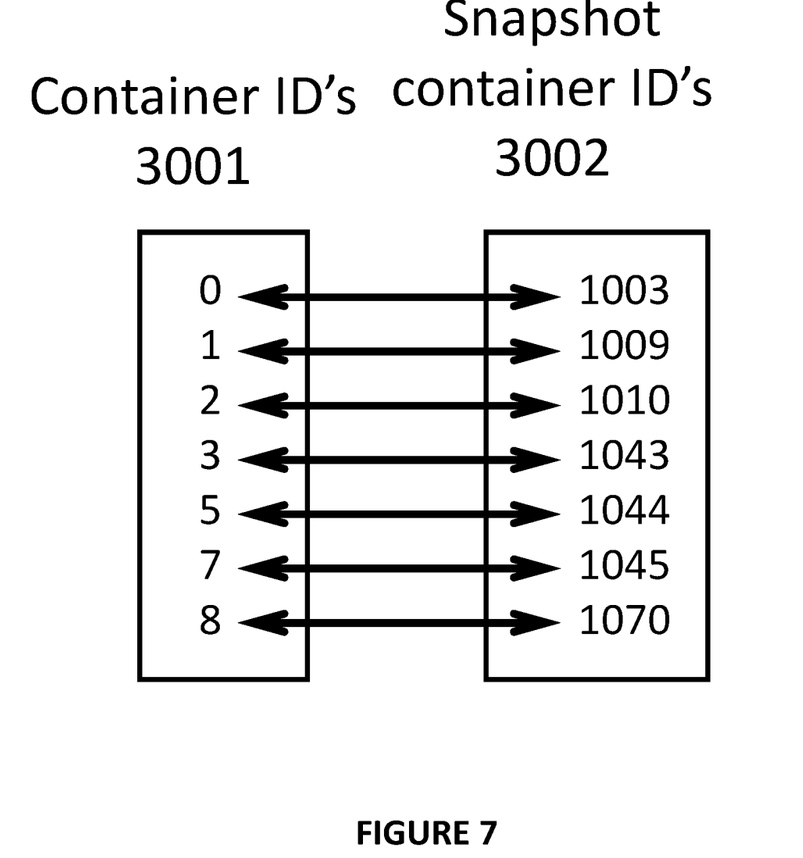
FIG. 7 illustrates the conceptual concordance between container identifiers 3001 and the snapshot container identifiers.

FIG. 7 illustrates the conceptual concordance between container identifiers 3001 and the snapshot container identifiers 3002. The list of container identifiers can be derived by examining the meta-data for the volume for which a snapshot was made. The list of snapshot container identifiers is contained in the table that describes the snapshot as was shown in FIGS. 3 and 4. This association does not depend on any numerical connection between the different identifiers, but can be determined by associating each item in one list of identifiers with the item at the same position in the other list. This association is established logically and is not stored explicitly.

In the invention, these operations can be substantially economized and the data kept by the CLDB to support these operations can be substantially minimized. For instance, during snapshot creation or deletion, the list of snapshot container identifiers is much more compactly represented so the corresponding tables are smaller and requests for this list return vastly less data.

In the context of snapshots, one of the requests the CLDB currently services is snapshot container locations. In an embodiment, file clients query the CLDB by snapcids. The CLDB looks up the corresponding RW cid to determine the snapcid's location; the snapcid is co-located with the RW cid and hence this works. The above lookup results in more read transactions at the CLDB end.

The enhanced file client obtains the RW cid corresponding to a snapcid as part of "getFid" API. The file client then looks up the location by RW cids, avoiding the need for a look-up at the CLDB.

Test Setup

Embodiments of the invention were tested using the following set up:

Number of Volumes: 4100 (4000 with repl 1 and 100 with repl 3)

Cluster size: 6 (5+1 CLDB/Zk)

Baseline Version (5.2.0): 6 Disks/Node

Snapshots Improvement Version: 5 Disks/Node

Total containers: 430K

Containers/Node: 86K

Table 1 below shows the test results.

TABLE 1

Test Results

| Snapshot Creation | Time Taken | Number of Transactions | Snapshots Tables Entries (number of Key-Value pairs) | Approximate Size of the Tables |
|---|---|---|---|---|
| BaseLine | 896 sec (~15 minutes) | 1,610,733 (1.6 million) | 1,246,400 | 69 MB |
| Snapshot Improvements Version | 541 seconds (~9 minutes) | 32,907 (~33 thousand) | 20,500 | 2 MB |
| Improvement | 40% (6 minutes) | 49x | 60x | 35x |

Computer Implementation

Figure 8:
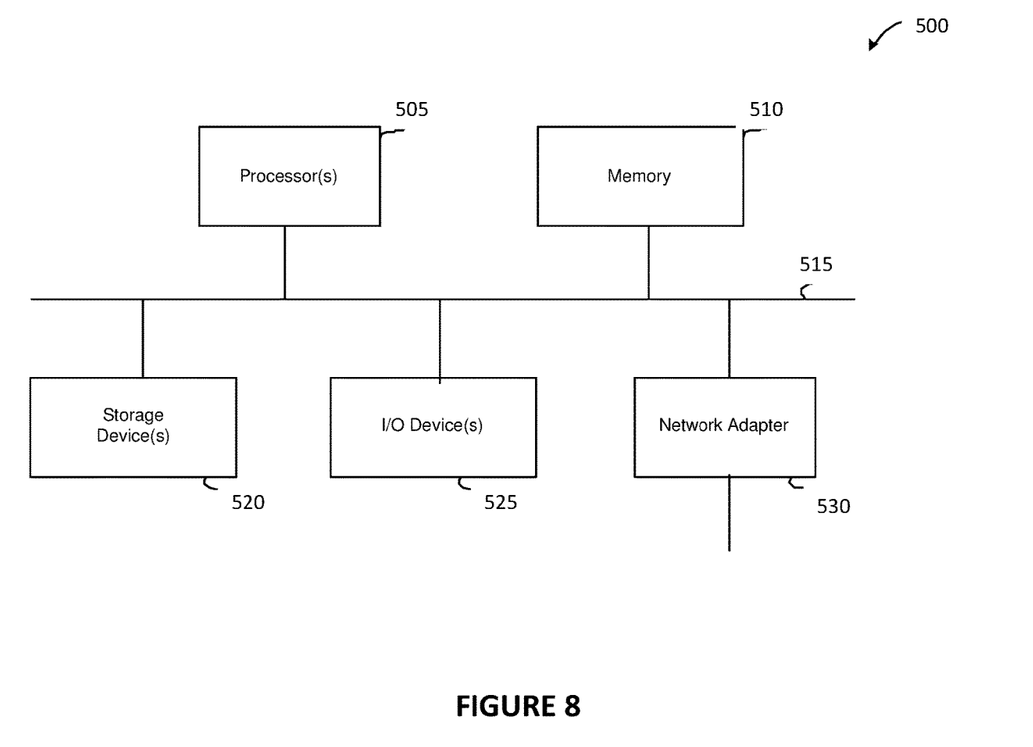
FIG. 8 is a block schematic diagram showing a machine in the example form of a computer system within which a set of instructions for causing the machine to perform one or more of the methodologies discussed herein may be executed.

FIG. 8 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 500 may include one or more central processing units ("processors") 505, memory 510, input/output devices 525, e.g. keyboard and pointing devices, touch devices, display devices, storage devices 520, e.g. disk drives, and network adapters 530, e.g. network interfaces, that are connected to an interconnect 515. The interconnect 515 is illustrated as an abstraction that represents any one or more separate physical buses, point to point connections, or both connected by appropriate bridges, adapters, or controllers. The interconnect 215, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 510 and storage devices 520 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 510 can be implemented as software and/or firmware to program the processor 05 to carry out actions described above. In some embodiments, such software or firmware may be initially provided to the processing system 500 by downloading it from a remote system through the computing system 500, e.g. via network adapter 530.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method comprising:
generating a volume snapshot for a volume in a distributed file system, the volume snapshot including a plurality of snapshot containers, each of the plurality of snapshot containers having a respective snapshot container identifier;
storing the snapshot container identifiers for the plurality of snapshot containers in one or more blocks, a first block of the one or more blocks including a contiguous sequence of multiple snapshot container identifiers for respective snapshot containers of the plurality of snapshot containers; and
storing information to specify the plurality of snapshot containers, wherein the information includes an identifier for the volume snapshot, a first snapshot container identifier at a beginning of the contiguous sequence of multiple snapshot container identifiers in the first block, and length information specifying a count of a number of snapshot container identifiers in the contiguous sequence of multiple snapshot container identifiers.

2. The computer-implemented method of claim 1, wherein storing the information includes storing one or more key-value pairs in a key-value store of a container location database (CLDB).

3. The computer-implemented method of claim 1, further comprising:
obtaining from the information a first set of information for the first block including the contiguous sequence of multiple snapshot container identifiers; and
converting the first set of information into a list of snapshot container identifiers for snapshot containers that are part of the volume snapshot.

4. The computer-implemented method of claim 1, wherein the information specifies the plurality of snapshot containers as a table of entries, each entry representing a respective block of the one or more blocks.

5. The computer-implemented method of claim 1, wherein the information specifies the plurality of snapshot containers in a single data structure.

6. The computer-implemented method of claim 1, further comprising:
receiving a request for a current size of a volume snapshot container for the volume snapshot; and
computing the current size of the volume snapshot container based on a size of each of the plurality of snapshot containers and on updates received when snapshots are deleted.

7. The computer-implemented method of claim 1, further comprising:

associating each respective snapshot container identifier of the snapshot container identifiers for the volume snapshot with an identifier of a corresponding read-write container, wherein a snapshot container identified by the respective snapshot container identifier is co-resident with the corresponding read-write container in a storage pool;
receiving a request for a location of a first snapshot container, the request including a given snapshot container identifier for the first snapshot container; and
determining the location of the first snapshot container based on a location of a first read-write container corresponding to the first snapshot container, the first read-write container being identified based on association of the given snapshot container identifier with an identifier of the first read-write container.

8. A non-transitory storage medium comprising instructions that upon execution cause one or more processors to:
generate a volume snapshot for a volume in a distributed file system, the volume snapshot including a plurality of snapshot containers, each of the plurality of snapshot containers having a respective snapshot container identifier;
store the snapshot container identifiers for the plurality of snapshot containers in one or more blocks, a first block of the one or more blocks including a contiguous sequence of multiple snapshot container identifiers for respective snapshot containers of the plurality of snapshot containers; and
store information to specify the plurality of snapshot containers, wherein the information includes an identifier for the volume snapshot, a first snapshot container identifier at a beginning of the contiguous sequence of multiple snapshot container identifiers in the first block, and length information specifying a count of a number of snapshot container identifiers in the contiguous sequence of multiple snapshot container identifiers.

9. The non-transitory storage medium of claim 8, wherein the information includes one or more key-value pairs stored in a key-value store of a container location database (CLDB).

10. The non-transitory storage medium of claim 8, wherein the instructions upon execution cause the one or more processors further to:
obtain from the information a first set of information for the first block including the contiguous sequence of multiple snapshot container identifiers; and
convert the first set information into a list of snapshot container identifiers for snapshot containers that are part of the volume snapshot.

11. The non-transitory storage medium of claim 8, wherein the information comprises a table of entries, each entry representing a respective block of the one or more blocks.

12. The non-transitory storage medium of claim 8, wherein the first snapshot container identifier at the beginning of the contiguous sequence of multiple snapshot container identifiers and the length information together specify an entire content of the first block.

13. The non-transitory storage medium of claim 8, wherein the instructions upon execution cause the one or more processors further to:
receive a request for a current size of a volume snapshot container for the volume snapshot; and compute the current size of the volume snapshot container based on a size of each of the plurality of snapshot containers and on updates received when snapshots are deleted.

14. The non-transitory storage medium of claim 8, wherein of the instructions upon execution cause the one or more processors further to:
associate each respective snapshot container identifier of the snapshot container identifiers for the volume snapshot with an identifier of a corresponding read-write container, wherein a snapshot container is co-resident with the corresponding read-write container in a storage pool;
receive a request for a location of a first snapshot container, the request including a given snapshot container identifier for the first snapshot container; and
determine the location of the first snapshot container based on a location of a first read-write container corresponding to the first snapshot container, the first read-write container being identified based on association of the given snapshot container identifier with an identifier of the first read-write container.

15. A system comprising:
one or more cluster nodes, each cluster node including a storage pool; and
a container location database (CLDB) coupled with the one or more cluster nodes, the CLDB to maintain location information for data containers stored in the storage pools of the cluster nodes;
a processor; and
a non-transitory storage medium storing instructions executable on the processor to:
generate a volume snapshot for a volume of data in the one or more cluster nodes, the volume snapshot including a plurality of snapshot containers, each of the plurality of snapshot containers having a respective snapshot container identifier,
store the snapshot container identifiers for the plurality of snapshot containers in one or more blocks, a first block of the one or more blocks including a contiguous sequence of multiple snapshot container identifiers for respective snapshot containers of the plurality of snapshot containers, and
store a key-value pair in a key-value store of the CLDB to specify the plurality of snapshot containers, wherein the key-value pair includes an identifier for the volume snapshot, a starting snapshot container identifier at a beginning of the contiguous sequence of multiple snapshot container identifiers in the first block, and length information specifying a count of a number of snapshot container identifiers in the contiguous sequence of multiple snapshot container identifiers.

16. The system of claim 15, wherein the instructions are executable on the processor to:
obtain the key-value pair from the key-value store; and
convert information in the key-value pair into a list of snapshot container identifiers for snapshot containers that are part of the volume snapshot.

17. The system of claim 15, wherein the starting snapshot container identifier at the beginning of the contiguous sequence of multiple snapshot container identifiers and the length information together specify an entire content of the first block.

18. The system of claim 15, wherein the key-value pair comprises:
a key that includes the identifier for the volume snapshot and the starting snapshot container identifier, and a value that includes the length information, or
a key that includes the identifier for the volume snapshot, and a value that includes the starting snapshot container identifier and the length information.

19. The system of claim 15, wherein the instructions are executable on the processor to:
receive a request for a current size of a volume snapshot container for the volume snapshot; and
compute the current size of the volume snapshot container based on a size of each of the plurality of snapshot containers and on updates received when snapshots are deleted.

20. The system of claim 15, wherein the instructions are executable on the processor to:
associate each respective snapshot container identifier of the snapshot container identifiers for the volume snapshot with an identifier of a corresponding read-write container, wherein a snapshot container identified by the respective snapshot container identifier is co-resident with the corresponding read-write container in a storage pool;
receive a request for a location of a first snapshot container, the request including a given snapshot container identifier for the first snapshot container; and
determine the location of the first snapshot container based on a location of a first read-write container corresponding to the first snapshot container, the first read-write container being identified based on association of the given snapshot container identifier with an identifier of the first read-write container.

* * * * *